United States Patent Office 3,258,469
Patented June 28, 1966

3,258,469
AMINOBICYCLOALKANES
Elwood P. Blanchard, Jr., and Blaine C. McKusick, Wilmington, Del., assignors to E. I. du Pont de Nemours and Company, Wilmington, Del., a corporation of Delaware
No Drawing. Filed Oct. 30, 1963, Ser. No. 320,001
5 Claims. (Cl. 260—326.8)

This invention relates to tertiary amines and more particularly to such amines wherein the amino nitrogen is attached to bridgehead carbon of a polycyclic structure.

The compounds of this invention are bicyclo($n$.1.0)-hydrocarbyl amines wherein the $n$ is an integer of 2–6 and the amine nitrogen is tertiary. Preferred compounds have the general formula (1) 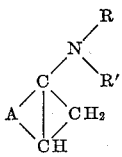

wherein A is a saturated hydrocarbyl diradical of up to 8 carbons attached through methylene groups to the cyclopropyl ring, R and R' taken separately are selected from the class consisting of alkyl, alkoxyalkyl, and cyclic hydrocarbon of up to 8 carbons each, and taken together R and R' form a hydrocarbon or ether-containing hydrocarbyl diradical of up to 6 carbons.

The most useful of these bridgehead amines can be represented by the formula (2) 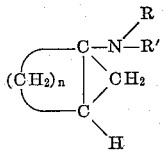

wherein $n$ is an integer of 2 to 6 and R and R' are lower alkyl, or together form an alkylene diradical of 2–6 carbons.

These new compounds contain a cyclopropyl group which is characteristic of many compounds having utility in medical practice, in the insecticidal field or in chemical transformations as in alkylating or polymer-forming reactions.

The new compounds of this invention are obtained by reaction of a tertiary amine having only one ethylenic unsaturation in a ring that is α-β to the nitrogen with a methylene dihalide wherein at least one of the halogens is iodine, any remaining being chlorine, bromine, or iodine in the presence of zinc and copper. This reaction can be represented by the equation:

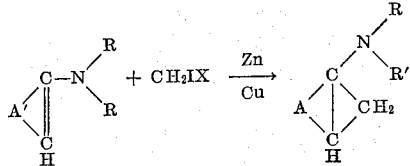

wherein A, R, and R' are as previously stated, A' is a saturated hydrocarbyl diradical of from 2 to 8 carbons, and X is a halogen of atomic number 17–53. The amine employed is an N-disubstituted cyclic enamine, i.e., N-N-disubstituted α,β-ethylenically unsaturated amine. They are obtained by reaction of a cyclic ketone with a secondary amine under anhydrous conditions, e.g., with calcium chloride suitably in the presence of ether.

The following examples further illustrate the preparation and properties of this new class of compounds.

*Example 1.*—1-pyrrolidinobicyclo(4.1.0)heptane

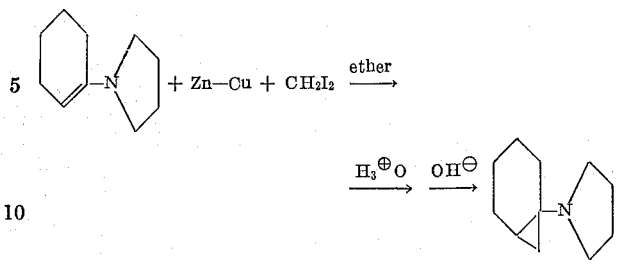

In a 200-ml. flask was charged zinc-copper couple (13.46 g.), diethyl ether (62 ml.) and methylene iodide (53.6 g.). A crystal of iodine was added and the mixture heated at reflux for one hour whereupon the rate of gas evolution equalled 50 ml./3 min. The flash was chilled in ice water under a positive nitrogen pressure and then filtered through a dry sintered disc. One-half of this filtrate was charged into a 100-ml. flask and pyrrolidino-1-cyclohexene (14.7 g.) added. An immediate reaction occurred resulting in a gelatinous precipitate. The mixture was heated at reflux for two hours, cooled, and treated with two portions of hot ammonium chloride solution. The two-phase system was separated and then made alkaline with NaOH. The alkaline solution was extracted with two 100-ml. portions of ether and this extract dried over magnesium sulfate, filtered and the ether evaporated. The residue was distilled to give 1.6 g. of product. This product was combined with the product (1.5 g.) from an identical reaction and distilled through a semi-micro spinning band column to give 2.57 g. (8%) of 1-pyrrolidinobicyclo(4.1.0)heptane, B.P. 70–74.5° C./4 mm. Purification by gas chromatography gave purified material having $n_D^{25}$ 1.4876.

*Analysis.*—Calcd. for $C_{11}H_{19}N$: C, 80.00; H, 11.50; N, 8.50. Found: C, 79.61, 79.67; H, 11.83, 11.85; N, 8.68, 8.78.

*Example II.*—1-dimethylaminobicyclo(4.1.0)heptane

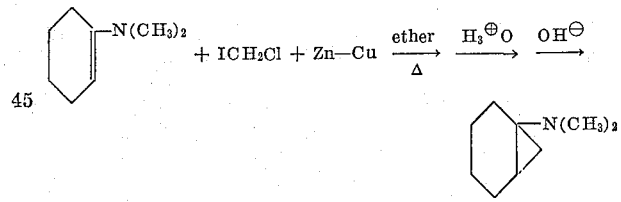

In a 500-ml. flask was charged chloroiodomethane (53 g.), zinc-copper couple (20.2 g.), and ether (63 ml.). The mixture was heated at reflux with stirring for one hour and 20 minutes. The flask was chilled in an ice water bath and dimethylamino-1-cyclohexene (18.75 g.) added with stirring. A two-phase system resulted. Tetrahydrofuran (35 ml.) was added to aid solution and the mixture stirred at reflux for 24 hours. The slurry was cooled in an ice bath and aqueous ammonium chloride (100 ml.) added slowly. The ether phase was discarded and the aqueous phase filtered, extracted twice with 50 ml. ether, and then made alkaline with a solution of 40 g. NaOH in 150 ml. of water. The alkaline solution was extracted with three 100-ml. portions of ether. This ether phase was dried over MgSO$_4$, filtered, and the ether distilled through a spinning-band column. Distillation of the residue gave 1.7 g. (8.15%) of 1-dimethylaminobicyclo(4.1.0)heptane, B.P. 76.5–77.0° C. at 36 mm. A sample, purified by formation of its picrate salt, had $n_D^{25}$ 1.4596.

*Analysis.*—Calcd. for $C_9H_{17}N$: C, 77.70; H, 12.22; N, 10.08. Found: C, 77.74, 77.65; H, 12.55, 12.60; N, 9.97, 9.94.

*Example III.—1-dimethylaminobicyclo(3.1.0)hexane*

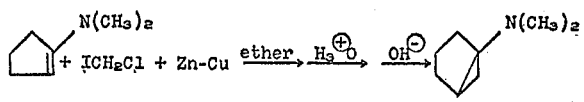

In the manner described for the preparation of 1-dimethylaminobicyclo(4.1.0)heptane, a reaction between zinc-copper couple (33 g.), chloriodomethane (86.5 g.), and dimethylamino-1-cyclopentene (27.8 g.) in diethyl ether, 200 ml., was carried out. Fractionation of the product through a semi-micro spinning-band column gave 11.19 g. (35.8%) of 1-dimethylaminobicyclo(3.1.0)hexane which had B.P. 78–81° C./100 mm., $n_D^{25}$ 1.4487–1.4495.

*Analysis.*—Calcd. for $C_8H_{15}N$: C, 76.80; H, 12.00; N, 11.20. Found: C, 76.79, 76.82; H, 12.33, 12.23; N, 10.51, 10.62.

Repetition of the general procedure of the above examples by reacting chloroiodomethane and zinc-copper with di-n-butylamino-1-cyclohexene (from cyclohexanone and di-n-butylamine) yields 1-di-n-butylaminobicyclo(4.1.0)heptane. Similarly, with di-n-octylamino-1-cyclohexene (from cyclohexanone and di-n-octylamine), 1-di-n-octylaminobicyclo(4.1.0)heptane is formed. Also available by use of these general reactions are:

1-dibenzylaminobicyclo(4.1.0)heptane (from dibenzylamine and cyclohexanone followed by reaction with methylene iodide and zinc-copper);

1-di-xylylaminobicyclo(4.1.0)heptane (from dixylylamine and cyclohexanone followed by reaction with chloroiodomethane and zinc-copper);

1-di-cyclohexylaminobicyclo(4.1.0)heptane (from dicyclohexylamine and cyclohexanone followed by reaction with chloroiodomethane and zinc-copper);

1-di(ethoxyethyl)aminobicyclo(3.1.0)hexane (from di(ethoxyethyl)amine and cyclopentanone followed by reaction of the product formed with chloroiodomethane and zinc-copper);

1-morpholinobicyclo(3.1.0)hexane (from morpholine and cyclopentanone followed by reaction of 1-morpholinocyclopentene with chloroiodomethane and zinc-copper);

1-diethylaminobicyclo(5.1.0)octane (from cycloheptanone and diethylamine followed by reaction with chloroiodomethane and zinc-copper);

1-diethylaminobicyclo(6.1.0)nonane (from cyclooctanone and diethylamine followed by reaction with diiodomethane and zinc-copper);

1-di-n-propylaminobicyclo(2.1.0)pentane (from cyclobutanone and di-n-propylamine followed by reaction with chloroiodomethane and zinc-copper);

1-N-hexamethyleneiminobicyclo(4.1.0)heptane (from the reaction of hexamethyleneimine with cyclohexanone followed by treatment of the product with chloroiodomethane and zinc-copper).

The new compounds of this invention have a cyclopropyl group and a tertiary amine group. They are relatively high-boiling liquids of low viscosity and good stability. They are useful as hydraulic fluids. They are acid acceptors and are useful in chemical reactions where tertiary amines have been used, e.g., for the reaction of an acid halide with a primary or secondary amine. They are also useful as stabilizers, e.g., when incorporated with relatively unstable vinyl halide polymers to inhibit degradation due to light. Furthermore, they are useful as initiators where a tertiary amine of low basicity is employed as in polymerization of carbonyl-containing compounds.

The foregoing detailed description has been given for clearness of understanding only and no unnecessary limitations are to be understood therefrom. The invention is not limited to the exact details shown and described, for obvious modifications will occur to those skilled in the art.

The embodiment of the invention in which an exclusive property or privilege is claimed are defined as follows:

1. A compound of the formula

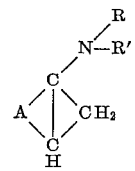

wherein A is a cyclic alkylene containing 2 to 8 carbon atoms attached to the cyclopropyl ring through methylene groups, R and R′ taken separately can be the same or different and are selected from the class consisting of alkyl of up to 8 carbons, lower alkoxy-lower alkyl, and cyclic hydrocarbon selected from the class consisting of cyclohexyl, benzyl and xylyl, and R and R′ taken together are selected from the class consisting of saturated aliphatic hydrocarbyl and saturated monoether-aliphatic hydrocarbyl of up to 6 carbons.

2. A compound of the formula

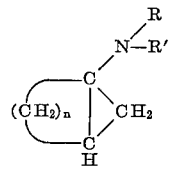

wherein $n$ is an integer of 2 to 6 and R and R′ taken separately can be the same or different and are lower alkyl and taken together are alkylene of 2 to 6 carbons.

3. 1-pyrrolidinobicyclo(4.1.0)heptane.
4. 1-dimethylaminobicyclo(4.1.0)heptane.
5. 1-dimethylaminobicyclo(3.1.0)hexane.

References Cited by the Examiner
UNITED STATES PATENTS
3,074,984   1/1963   Simmons _____ 260—414

HENRY R. JILES, *Acting Primary Examiner.*
MARY O'BRIEN, *Assistant Examiner.*